(12) United States Patent
Tsubota

(10) Patent No.: US 7,408,315 B2
(45) Date of Patent: Aug. 5, 2008

(54) MOTOR CONTROL APPARATUS, MOTOR CONTROL CIRCUIT, AND METHOD THEREOF

(75) Inventor: Masashi Tsubota, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 0 days.

(21) Appl. No.: 11/522,926

(22) Filed: Sep. 19, 2006

(65) Prior Publication Data
US 2007/0075674 A1    Apr. 5, 2007

(30) Foreign Application Priority Data
Sep. 30, 2005   (JP) .............................. 2005-289056

(51) Int. Cl.
*G05B 1/06* (2006.01)
(52) U.S. Cl. ..................... 318/605; 318/599; 318/661
(58) Field of Classification Search ......... 318/601–605, 318/661, 254, 720–724, 599
See application file for complete search history.

(56) References Cited
U.S. PATENT DOCUMENTS
6,084,376 A * 7/2000 Piedl et al. .................. 318/605

| | | | |
|---|---|---|---|
| 6,931,918 B2 * | 8/2005 | Herb ........................... | 73/116 |
| 6,948,382 B2 * | 9/2005 | Sakai et al. ............ | 73/862.326 |
| 2005/0231145 A1 * | 10/2005 | Mukai et al. ................. | 318/432 |
| 2005/0252272 A1 * | 11/2005 | Otsuka et al. ................ | 73/1.01 |

FOREIGN PATENT DOCUMENTS

JP   2004-301806     10/2004
JP   2005-010024   * 1/2005

OTHER PUBLICATIONS

Sougou Denshi Publishing Company, "Basics and Applications of Brushless Servo Motor," pp. 72-74, Jun. 1985.

* cited by examiner

*Primary Examiner*—Bentsu Ro
(74) *Attorney, Agent, or Firm*—McGinn IP Law Group, PLLC

(57) ABSTRACT

A motor control apparatus for controlling a motor based on an output from a sensor includes a storage unit storing a value according to an excitation power supply to excite the sensor, a PWM output unit outputting a PWM output signal having a pulse width modulated to have a duty ratio corresponding to a value stored to the storage unit, and a filter input with the PWM output signal from the PWM output unit. The sensor is supplied with the excitation power supply based on an output from the filter.

18 Claims, 6 Drawing Sheets

MOTOR CONTROL APPARATUS, MOTOR CONTROL CIRCUIT, AND METHOD THEREOF

BACKGROUND OF THE INVENTION

1. Field of the Invention

The present invention relates to a motor control apparatus for controlling a motor and a control method thereof, and particularly to a motor control apparatus for controlling a motor having a sensor and a control method thereof.

2. Description of Related Art

In recent years, there are increasing demands for linear rotation of a motor, attracting attention to techniques to accurately control a motor. One of the techniques is a technique to use a sensor to detect a rotation angle and speed, particularly a technique using a resolver. The resolver is a kind of rotary transformer that includes a stator and a rotor. The resolver detects a position of the rotor rotating correspondingly to a motor rotation by an output from the stator. The resolver is generally supplied with an excitation power supply. Based on the excitation power supply, a signal corresponding to the position of the stator and the rotor is outputted from the resolver. The stator is usually placed to 90° rotated position. Thus the resolver outputs two kinds of output signal modulated by sine and cosine waves. This is disclosed in "Sougou Denshi Publishing Company, Basics and Applications of Brushless Servo Motor, pp. 72-74, June, 1985.

In the conventional motor control method using a resolver, sine and cosine wave output signals, which are analog signals, are digitalized using a R/D converter (resolver/digital converter). This technique is disclosed in Japanese Unexamined Patent Application Publication No. 2004-301806. The excitation power supply to the resolver is generated by converting sine wave digital data stored to data ROM (Read Only Memory) into analog data by DAC (Digital-to-Analog Converter), filtering (integrating) the analog data by LPF (Low Pass filter) and amplifying the analog data.

The technique disclosed in Japanese Unexamined Patent Application Publication No. 2004-301806 compares the digital signal outputted from the R/D converter with an expected value to detect a rotation position. Based on the detected rotation position of a motor, a driving current to drive the motor is controlled. This allows a feedback control on the rotation speed of a motor. Specifically, in case the current rotation speed of the motor is detected to be faster than a desired speed by an output signal from the resolver, the driving current is controlled to slow the rotation speed. On the other hand in case the rotation speed is slower than the desired speed, the driving current is controlled to speed up the rotation speed.

At this time, the timing to sample the output signal from the resolver is previously determined. For example samplings are performed for 3 timings at 0, 90, and 180 degrees. For a sine wave, at 0 and 180 degrees, it indicates a center value of an amplitude of a sine wave for excitation. At 90 degrees, it indicates the maximum amplitude value of a sine wave for excitation. Therefore, by comparing a center value of an amplitude of a sine wave for excitation, an expected maximum amplitude value, and an actual measurement value that sampled from a sine and a cosine waves outputted from the resolver, it is possible to detect a difference. Accordingly controlling a driving current gives a feedback.

However amplitudes of sine and cosine waves vary due to a heat generated by a motor, a heat of an apparatus controlled by the motor, a fluctuation in lines from a resolver to the motor control apparatus, a fluctuation in amplifier circuit for amplifying sine and cosine waves, and a fluctuation in power supply voltage supplied to the amplifier circuit, because the resolver is mounted near the motor. For example in case an amplitude of a sine wave from the resolver becomes smaller, the small amplitude is the maximum value, thereby making a dynamic range smaller. Specifically, as a signal outputted from the resolver is an analog signal, an A/D (Analog-to-Digital) conversion is performed to process the signal inside the MCU (MicroContoller Unit). A resolving power of an A/D conversion circuit is configured assuming that an amplitude is an expected value. Accordingly if the amplitude only reaches 50% of the expected value, the resolving power of the A/D conversion circuit relatively becomes smaller. This causes an accuracy of motor control to be decreased.

Further, in case a motor angle is detected by comparing an amplitude of an output signal from the resolver with an expected value, an amplitude value itself may change, generating another problem of a detection of an incorrect motor angle.

The present invention is made in light of the above issues and is purported to provide a motor control apparatus a motor control circuit and a method thereof capable of a control with high accuracy.

SUMMARY OF THE INVENTION

According to an aspect of the present invention, there is provided a motor control apparatus for controlling a motor based on an output from a sensor that includes a storage unit storing a value according to an excitation power supply to excite the sensor, a PWM (Pulse Width Modulation) output unit outputting a PWM output signal having a pulse width modulated to have a duty ratio corresponding to a value stored to the storage unit, and a filter input with the PWM output signal from the PWM output unit, the sensor is supplied with the excitation power supply based on an output from the filter. This provides a high performance motor control apparatus at low cost.

According to another aspect of the present invention, there is provided a motor control method for controlling a motor based on an output from a sensor that includes storing a value based on an excitation power supply for exciting the sensor, outputting a PWM (Pulse Width Modulation) output signal having a duty ratio corresponding to the stored value, and generating an excitation power supply for exciting the sensor according to the PWM output signal. Replacing the DAC for converting a value stored to a storage unit into an analog by PWM reduces cost. This provides a high performance motor control method at low cost.

According to another aspect of the present invention, there is provided a motor control circuit for controlling a motor based on an output from a sensor that includes an excitation power supply generation unit generating an excitation power supply for exciting the sensor, and a feedback control unit generating a control signal in response to a sensor output signal outputted from the sensor according to an excitation power supply from the excitation power supply generation unit. The motor control circuit controls an amplitude of an excitation power supply to be supplied to the sensor according to the control signal. This enables to accurately control.

In the present invention, as a feedback control is performed to control an amplitude of an output signal from a sensor to be a desired value, it is able to provide a motor control apparatus a motor control circuit and a method thereof with an accurate driving signal to a motor according to the output signal.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

First Embodiment

Figure 1:
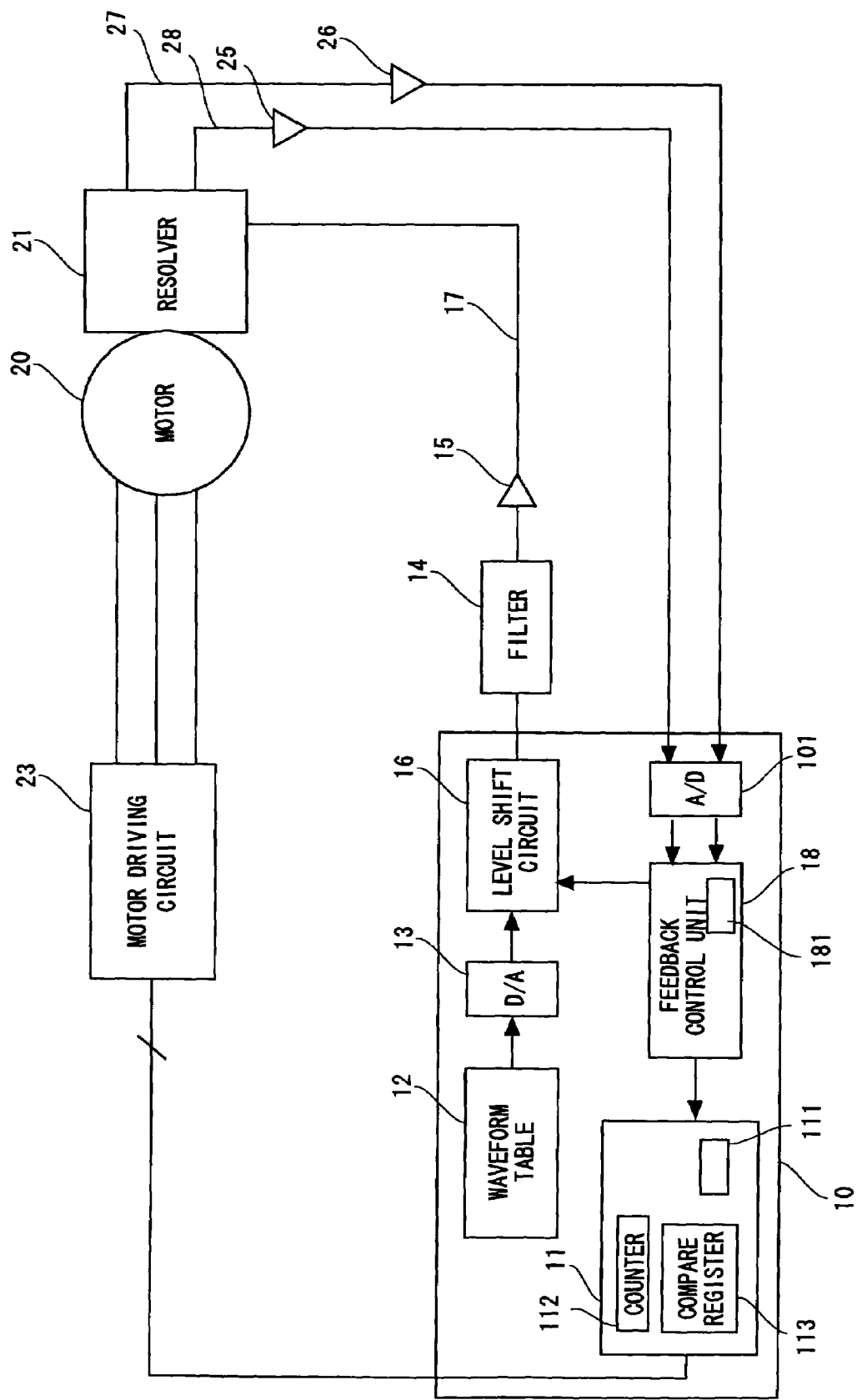
FIG. 1 is a view showing a configuration of a motor control system using a motor control apparatus according to a first embodiment of the present invention.

FIG. 1 is a view showing a configuration of a motor control system of this embodiment. The motor control system includes a Micro Controller Unit 10, MCU, which is a motor control apparatus, a driving signal generation unit 11, a waveform table 12, a D/A conversion circuit 13, a filter 14, an amplifier 15, a shift register circuit 16, an excitation power supply line 17, a feedback control unit 18, a motor 20, a resolver 21, a motor driving circuit 23, amplifiers 25 and 26, a sine wave output line 27, a cosine wave output line 28, and an A/D conversion circuit 101.

An overall operation of a motor control system is described hereinafter in reference to FIG. 1. The motor control system includes the motor 20, the MCU 10 for controlling the motor 20, the motor driving circuit 23 for generating a driving current by a driving signal from the MCU 10, and the resolver 21, which is a sensor for detecting a rotation angle of the motor 20.

The MCU 10 generates a driving signal to drive the motor 20 based on a control signal input externally, for example a target value specified to a target value setting circuit 111 of the driving signal generation unit 11. The driving signal is input to the motor driving circuit 23. The motor driving circuit 23 generates a driving current based on a driving signal from the MCU 10. The motor 20 is a three-phase motor, for example, that is driven by U, V, and W phase driving current from the motor driving circuit 23. The resolver 21 outputs an output signal corresponding to a rotation angle of a motor. The output signal from the resolver 21 and the target value are input to the MCU 10 via the amplifiers 25 and 26. The MCU 10 performs a feedback control according to the output signal from the resolver 21 and a control signal from outside. Then a driving signal with a feedback control being performed is output to the motor driving circuit 23. A feedback control is performed by repeating these operations.

For example in case a target value is supplied externally to the target value setting circuit 111 so that the motor 20 rotates in a desired speed, the driving signal generation unit 11 mounted to the MCU 10 generates a driving signal so as to rotate a motor in the rotating speed. An example where the motor 20 is a three-phase DC brushless motor is explained hereinafter. In this case, a driving signal is comprised of 6 signals which are u1, u2, v1, v2, w1, and w2 phases. Note that u2, v2, and w2 phases are reversed phases to u1, v1, and w1 phases respectively. Specifically u1, v1, and w1 phases are positive outputs, while u2, v2, and w2 phases are negative outputs. Needless to say that the motor 20 is not restricted to the three-phase DC brushless motor.

The MCU 10 controls the motor 20 by PWM, Pulse Width Modulation. To be specific, the driving signal generation unit 11 configures switching cycle (PWM pulse cycle) of the three-phase switching circuit mounted to the motor driving circuit 23 according to a control signal from the feedback control unit 18. Then, the driving signal generation unit 11 changes on time of the switching circuit in the configured switching cycle to control. Specifically, a duty ratio of each phase is controlled by changing pulse width in a specified PWM pulse cycle. A voltage applied to each phase of the motor 20 varies depending on the duty ratio. Thus a current flowing to the motor can be controlled. Increasing the duty ratio to extend on time increases the amount of current flowing to the motor 20. This increases torque and rotation speed. On the other hand in case a duty ratio is lowered to decrease the rotation speed, a current flowing to the motor 20 decreases. This decreases torque and rotation speed. The MCU 10 calculates the current angle from a rotation angle sensor such as a resolver, and performs a calculation so as to pass a current corresponding to the angle and rotation direction to u, v, and w phases. Then the MCU 10 generates a motor driving signal by setting a value to a compare register based on the calculation result. By supplying sine waves shown in FIG. 3B with phases 120° shifted, it is possible to generate u, v, and w phase driving signals.

A digital value that has sampled a sine wave to generate an excitation power supply to the resolver 21 at a specified sampling frequency is stored to the waveform table 12. The value stored to the waveform table 12 is read out to be compared with a counter value so as to generate a pulse having a specified width. Further, a sine wave is generated by filtering (integrating) the pulse. Then a compare value is changed in an order stored to the waveform table 12 to generate the excitation power supply for the resolver 21. The excitation power supply is supplied to the resolver 21 via the excitation power supply line 17.

As shown in FIG. 1, the driving signal from the MCU 10 is input to the motor driving circuit 23. The motor driving circuit 23 includes switching circuits mounted to correspond to each phase as described in the foregoing. The motor driving circuit 23 turns on and off the switching circuits according to u1, u2, v1, v2, w1, and w2 phase driving signals so as to output u, v, and w phase driving currents to the motor 20. The motor 20 rotates based on a driving current from the motor driving circuit 23.

The resolver 21 detects a rotation angle of the motor 20 and outputs a signal based on the rotation angle. Usually the excitation power supply from the MCU 10 is supplied to the resolver 21. The resolver 21 outputs a signal corresponding to the excitation power supply and the position of the rotor. As the stator is located to 90° shifted position, the stator mounted to the resolver 21 outputs two kinds of signals modulated by sine and cosine waves. The outputs from the resolver 21 are referred to as sine and cosine wave outputs. The sine and cosine wave outputs pass through the sine wave output line 27 and the cosine wave output line 28 respectively and input to the MCU 10 via the amplifiers 25 and 26. The feedback control unit 18 of the MCU 10 calculates a rotation angle of a rotor of the resolver 21 according to the sine and cosine wave outputs. The rotor of the resolver 21 rotates correspondingly to the rotation of the motor 20. The feedback control unit 18 outputs a control signal for performing a feedback control to adjust rotation speed of a motor correspondingly to the calculated rotation angle. The driving signal generation unit 11 includes an up/down counter 112 for repeating an operation to count up and down between specified values and a compare register 113. The driving signal generation unit 11 generates a PWM signal by a control signal from the feedback control unit 18 and a threshold corresponding to a target value specified to the target value setting circuit 111 being set to the compare register. The counter described in the foregoing is an up/down counter, however a pulse width can be modulated in the same way with an up counter or a down counter.

Figure 3A:
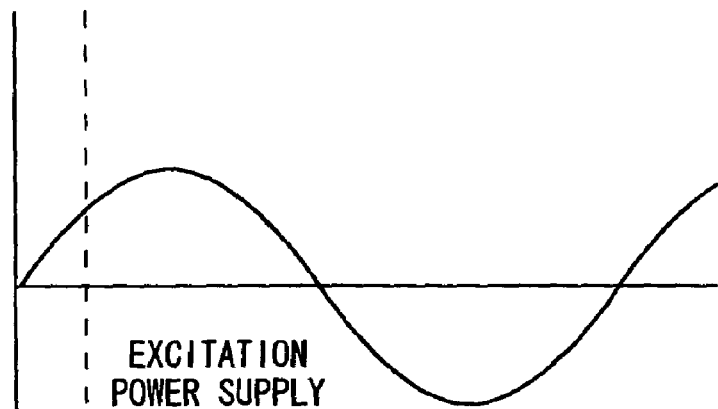
FIGS. 3A to 3C are views showing a waveform of an excitation power supply of a resolver and an output waveform of the resolver.

The excitation power supply is input to the resolver 21 from the level shift circuit 16 via the filter 14 and the amplifier 15. The excitation power supply supplied to the resolver 21 and an output from the resolver 21 are explained hereinafter in detail with reference to FIGS. 3A to 3C. FIG. 3A indicates the excitation power supply, FIG. 3B indicates a sine wave output, and FIG. 3C indicates a cosine wave output. Therefore, in case a sine wave shown in FIG. 3A is input to the resolver 21, a sine wave output has a waveform of FIG. 3B, and a cosine wave output has a waveform of FIG. 3C.

The outputs from the resolver 21 are generated based on the excitation power supply. The resolver 21 is excited by a sine wave. Accordingly outputs of the sine and the cosine outputs can be calculated as follows:

$$Vs = A^* \sin(\omega t + \phi)^* \sin\theta \quad (1)$$

$$Vc = A^* \sin(\omega t + \phi)^* \cos\theta \quad (2)$$

wherein $A^*\sin(\omega t)$ is the excitation power supply, Vs is the sine wave output, and Vc is the cosine wave output. Further, A is an amplitude of the excitation power supply and $\omega$ is an angular velocity to a frequency of the excitation power supply. $\theta$ is a rotation angle of a resolver rotor, and $\phi$ is an offset between the excitation power supply and the output of the resolver 21, namely a delay calculated previously between the excitation power supply and the output of the resolver 21.

Figure 3B:
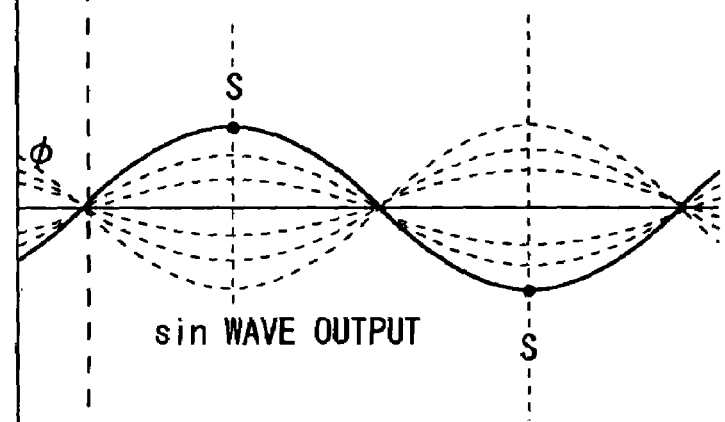
Figure 3C:
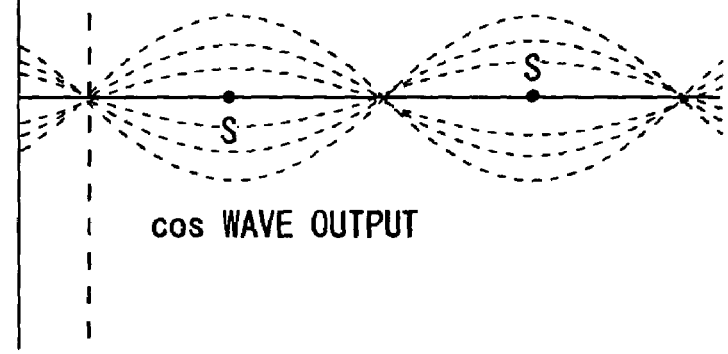

As described in the foregoing, the outputs from the resolver 21 are a function of the excitation power supply and the rotation angle $\theta$. As shown in the formulas (1) and (2), for the sine wave output Vs and the cosine wave output Vc, $A^*\sin(\omega t+\phi)$ is an envelope. The envelop is indicated with a solid line in FIG. 3B. Dotted lines in FIGS. 3B and 3C are outputs with varying rotation angle $\theta$. Phases of the sine wave output Vs and the cosine wave output Vc are shifted to 90°. Accordingly sum of a square of the sine wave output Vs and a square of the cosine wave output Vc is $A^*\sin(\omega t+\phi)$, which is based on the excitation power supply. For example in case a rotor rotation angle $\theta$ is constant at 90°, the sine wave output Vs is $A^*\sin(\omega t+\phi)$. That is, the sine wave output Vs has an output as with the solid line in FIG. 3B.

The cosine wave output Vc in this case is 0. That is, the cosine wave output Vc will be the solid horizontal line shown in FIG. 3C. On the other hand, in case a rotor rotation angle $\theta$ is constant at 0°, the cosine wave output Vc is $A^*\sin(\omega t+\phi)$ and the sine wave output Vs is 0. The rotation angle $\theta$ changes while the motor 20 is driving. Accordingly the sine wave output Vs and the cosine wave output Vc change correspondingly to the rotor rotation angle $\theta$ while satisfying $Vs^2+Vc^2=(A^*\sin(\omega t+\phi))^2$. Detecting the sine wave output Vs and the cosine wave output Vc and performing a specified calculation enables to calculate the rotation angle of a rotor of the resolver 21. The rotor of the resolver 20 rotates correspondingly to a rotation of the motor 20. Thus the rotation angle of the motor 20 can be calculated with the rotation angle of the rotor of the resolver 21.

Accordingly, the sine wave output Vs and the cosine wave output Vc change as shown in FIGS. 3B and 3C. In FIG. 3B, the solid line indicates a sine wave output at $\sin\theta=1$, which is $\theta=90°$. Other lines indicate a sine wave output Vs at $\sin\theta=-1$, $\pm\frac{1}{3}$, and $\pm\frac{2}{3}$. In FIG. 3C, the solid line indicates a cosine wave output Vc at $\cos\theta=0$, which is $\theta=90°$. Other lines indicate the cosine wave output Vc at $\sin\theta=\pm1$, $\pm\frac{1}{3}$, $\pm\frac{2}{3}$. While the motor is actually rotating, the outputs change correspondingly to the changing $\theta$. The rotor of the resolver 21 rotates correspondingly to the rotation of the motor 20, thus the rotation angle of the motor 20 can be calculated with the rotation angle of the rotor of the resolver 21.

The feedback control unit 18 calculates the rotation angle of the motor based on a digital value that the abovementioned sine wave output Vs and the cosine wave output Vc are converted by the A/D conversion circuit 101. For example the feedback control unit 18 samples the sine wave output Vs and the cosine wave output Vc after being converted from analog to digital at a specified sampling point S. In this embodiment, as the sampling point S, 90 and 270 degrees where the excitation power supply shown in FIGS. 3B and 3C changes at maximum. In this case, sampling frequency is configured so that the sine wave output Vs and the cosine wave output Vc are sampled at timings when $(\omega t+\phi)$ become 90° and 270°.

Specifically as shown in FIGS. 3B and 3C, considering the delay $\phi$ between the excitation power supply and the output of the resolver 21, the samplings is performed at 90 and 270 degrees so as to calculate Vs and Vc. Then calculate Vs/Vc. $\theta$ can be obtained by the formula $Vs/Vc=\tan\theta$. The feedback control unit 18 sends the control signal to the driving signal generation unit 11 according to the calculated rotation angle $\theta$ of the motor 20.

The driving signal generation unit 11 performs the feedback control based on the control signal from the feedback control unit 18 and the target value specified to the target value setting circuit 111. To be specific, the driving signal generation unit 11 controls to increase rotation speed in case a motor rotation angle does not reach a desired angle. In case the motor rotation angle exceeds a desired rotation angle, the driving signal generation unit 111 controls to slow the rotation speed. The feedback control is performed by changing a compare value specified to the compare register 113 for forming the abovementioned driving signal.

As described in the foregoing, the driving signal generation unit 11 stores a value, which is based on the control signal from the feedback control unit 18 and the target value specified to the target value setting circuit 111, as the compare value to the compare register 113. Then the driving signal generation unit 11 modulates a pulse width to control a driving current by comparing the stored the compare value and a counter value of the counter 112.

In the above explanation, the stator mounted to the resolver 21 is placed with a 90° shift, thus the resolver 21 outputs a sine and a cosine wave outputs. However the present invention is not restricted to this configuration.

In the first embodiment, an expected amplitude value storing circuit 181 for storing an expected amplitude value of an output signal from the resolver 21 is included in the feedback control unit 18. The expected amplitude value storing circuit 181 compares the expected amplitude value with a maximum amplitude value of the output signal from the resolver 21. If the maximum amplitude value of the output signal from the resolver 21 is compared to be smaller than the expected amplitude value, the level shift circuit 16 level shifts the amplitude based on the difference, and controls an amplitude of the excitation power supply to be larger corresponding to the difference. On the other hand in case an amplitude value of the output signal from the resolver 21 is larger than an expected amplitude value, expected amplitude value storing circuit 181 controls the level shift circuit 16 so that the excitation power supply becomes smaller correspondingly to the difference between the expected amplitude value and the amplitude value of the output signal. Then perform a feedback control so as to efficiently utilize the resolving power of the A/D conversion circuit 101. A method to level shift is not explained here because there are various methods such as a method to increase a power supply voltage to be supplied to an output buffer depending on the difference.

As described in the foregoing, controlling an amplitude of the excitation power supply according to the amplitude of the output signal from the resolver 21 and the expected amplitude value, the resolving power of the A/D conversion circuit mounted to the feedback control unit 18 can be efficiently utilized. This extends a dynamic range, thereby improving an accuracy of motor control.

Second Embodiment

Figure 2:
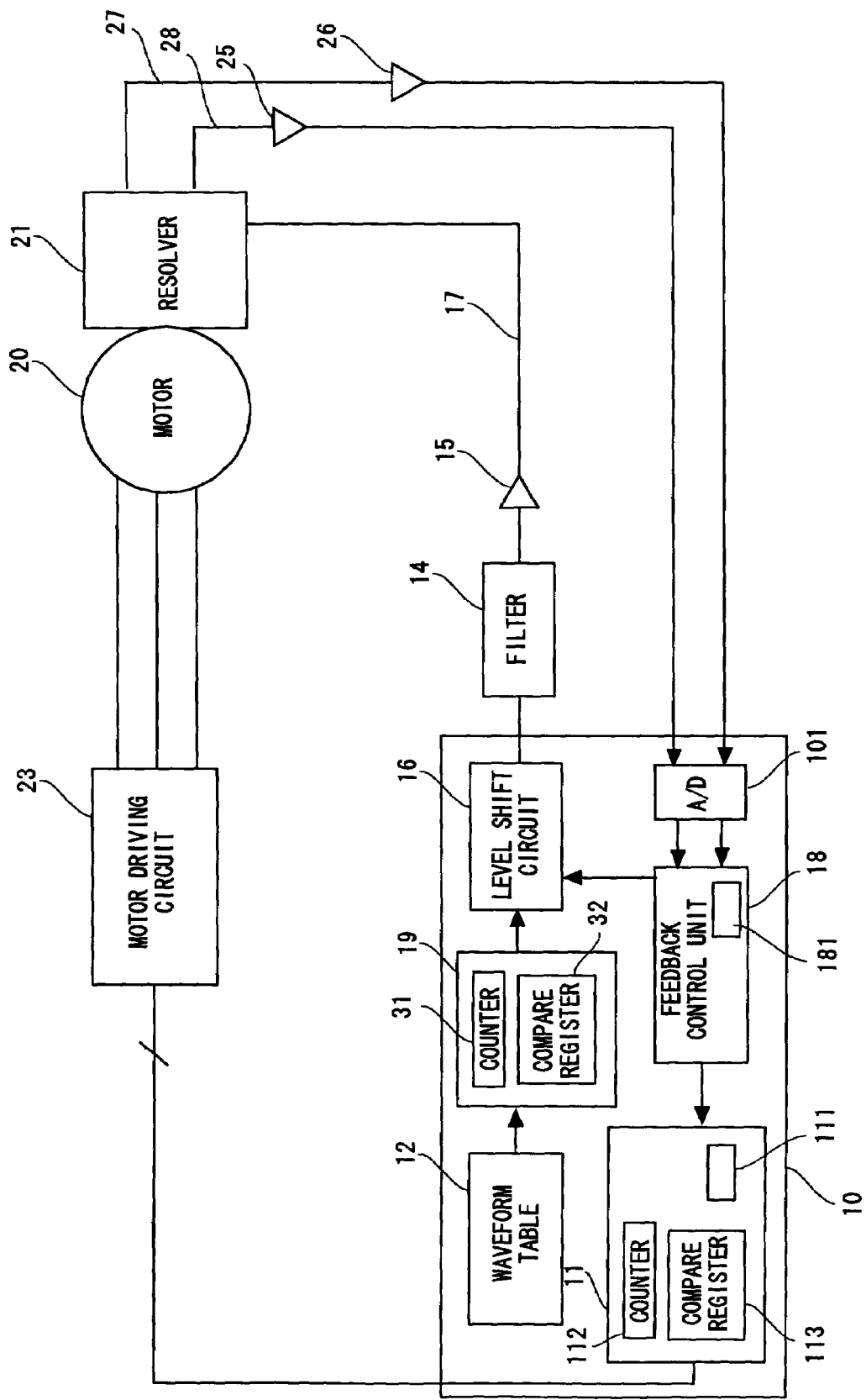
FIG. 2 is a view showing a configuration of a motor control system using a motor control apparatus according to a second embodiment of the present invention.

A configuration of a motor control system of a second embodiment is shown in FIG. 2. The blocks having identical reference numbers as FIG. 1 are not explained here. A difference from the first embodiment is that a PWM output circuit 19 is mounted instead of the D/A conversion circuit 13. The PWM output circuit includes a counter 31 and a compare register 32.

In the second embodiment, the excitation power supply to be supplied to the resolver 21 is generated based on an output from the PWM output circuit 19. The PWM output circuit 10 includes the counter 31 and the compare register 32. The counter 31 is for example an up/down counter similar to the counter 112 mounted to the driving signal generation unit 11. The counter 31 counts up and down according to a frequency of a clock generated inside the MCU 10 or a clock input externally. Specifically, the counter 31 repeatedly counts up and down to a specified value to generate a triangular wave. The counter 31 may be a combination of an up and a down counters, or a counter capable of switching between a count-up and a count-down operations.

The compare register 32 stores a value stored to the waveform table 12 so as to compare it with a value of the counter 31. Values that sampled a waveform for the excitation power supply at specified sampling frequencies are stored in order. The values stored to the waveform table 12 are stored one by one to the compare register 32 at a constant time interval. The waveform table 12 may be a memory such as ROM (Read Only Memory), RAM (Random Access Memory), or a register. In case a memory is used for the waveform table 12, a transfer between the waveform table 12 and the PWM output circuit 10 are performed by DMA (Direct Memory Access). Then a readout address is specified by a timer mounted to the MCU 10. This will decrease CPU load of the MCU 10. In case a register is used for the waveform table 12, the register can be a part of the timer mounted to the MCU 10. Values in the waveform table 12 are transferred to the compare register at timings specified by the time, which is PWM pulse cycle. The compare register 32 stores one value of the values in the waveform table 12. In this way, a bus line will not be occupied, thereby decreasing a load on the bus line.

The compare register 32 compares the value read out from the waveform table 12 with the counter value of the counter 31. Then specify a pulse width according to a timing that the counter value of the counter 31 coincides with the value of the waveform table 12. Specifically, a pulse width is determined by time between a timing that the counter value equals the value of the waveform table 12 while counting up and a timing that the counter value equals the value of the waveform table 12 while counting down. Repeating the comparison in an order transferred from the waveform table 12 to modulate the pulse width. The PWM output circuit 19 outputs a signal with a pulse width modulated in this way as a PWM output signal to the filter 14.

The counter 31 may be an up or a down counter. In case of using an up counter, a pulse width is specified by comparing a counter value of the up counter and a compare value. For example a pulse width is specified based on a timing that a timing when the count value is 0 coincides with the compare value. As with a down counter, the pulse width is specified based on the comparison result between the counter value of the down counter and the compare value.

The filter 14 shapes the waveform of the PWM output signal to output a sine wave. The filter 14 is for example a low-pass filter (LPF) that converts a waveform of a PWM output signal to a sine wave. In this example, the filter 14 generates a sine waveform by a high-level density of the PWM output signal. That is, in a phase a duty ratio of the PWM output signal is high, which is a phase where on pulse width is longer, a voltage of the excitation power supply is high. On the other hand in a phase a duty ratio is low, which is a phase an on pulse width is short, a voltage of the excitation power supply is low. This makes the excitation power supply be the sine wave. An output from the filter 14 is amplified by the amplifier 15 so as to generate a sine wave excitation power supply to be supplied to the resolver 21.

As described in the foregoing, generating the excitation power supply by PWM output realizes to generate the excitation power supply only with logic circuits. Accordingly a chip size of the MCU can be reduced. Specifically, DAC or converting a value stored to the waveform table 12 to an analog is not necessary. Thus a high resistance device, which is an analog device, is not needed to be formed in the MCU 10, thereby reducing a circuit size. This improves productivity and cost efficiency. A simple configuration is capable of providing an accurate excitation power supply and an accurate feedback control. This enables to provide a high performance motor control apparatus at low cost.

Third Embodiment

In the second embodiment, the excitation power supply is generated by the PWM output circuit. However the amplitude of the output needs to be changed, thereby requiring a level shift circuit. A third embodiment described hereinafter does not require a level shift circuit to change the amplitude.

Figure 4:
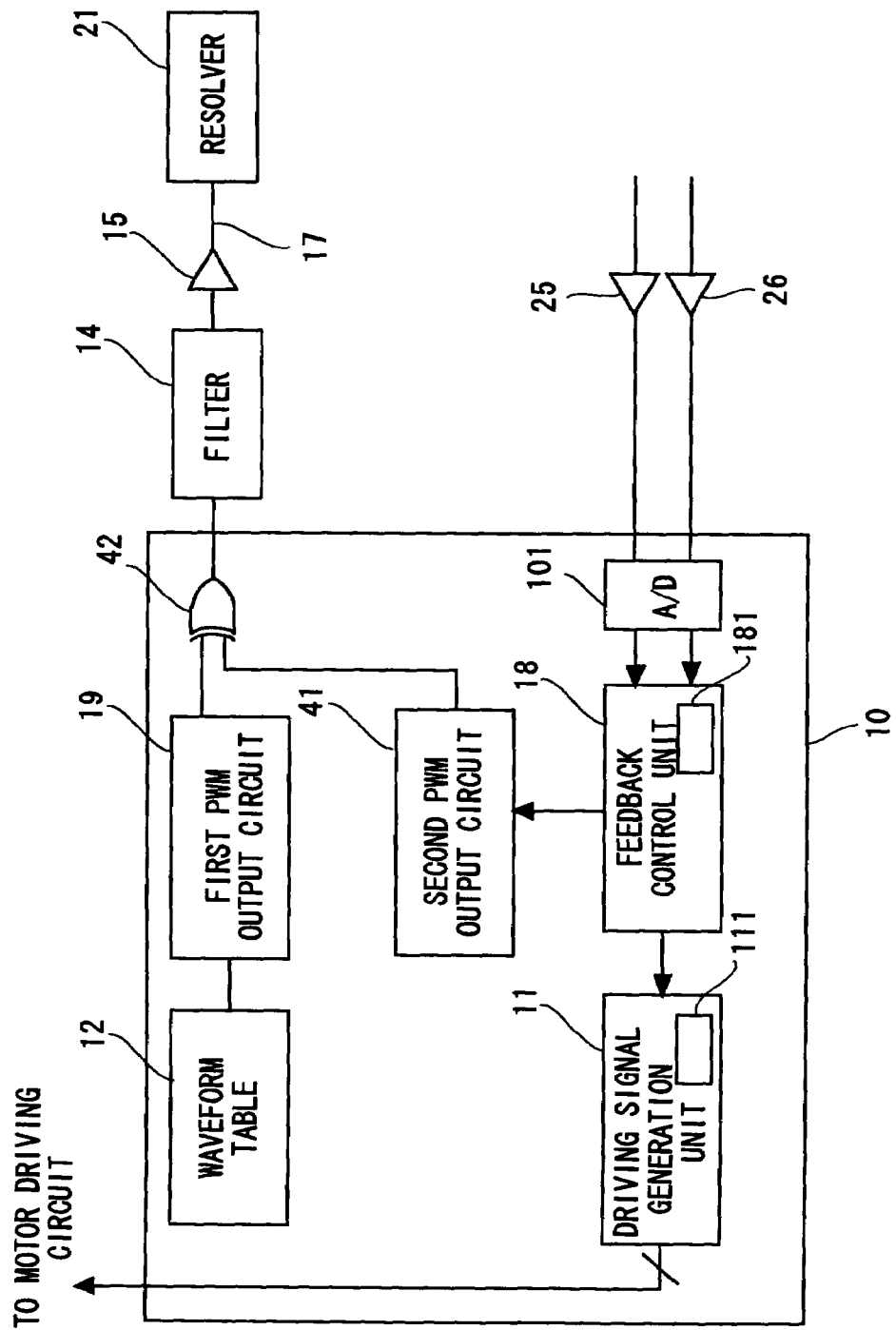
FIG. 4 is a view showing a configuration for adjusting an amplitude of an excitation power supply for a motor control apparatus according to a third embodiment of the present invention.

A configuration for adjusting the amplitude of the excitation power supply is described hereinafter in detail with reference to FIG. 4. FIG. 4 shows a part of a configuration of a motor control apparatus. Components identical to those in FIGS. 1 and 2 are not explained here. As shown in FIG. 4, a second PWM output circuit 41, a comparator circuit, and an EX-OR circuit 42 are mounted to the MCU 10 in addition to the first PWM output circuit 19.

The waveform table 12 and the first PWM output circuit 19 are configured and process in the same way as the above configurations. The second PWM output circuit 41 outputs a pulse at a constant cycle. A duty ratio of the pulse is changed according to the control signal from the feedback control unit 18. That is, the second PWM output circuit 41 outputs a second PWM output signal having a duty ratio corresponding to an amplitude of the resolver output. In this example, a pulse frequency outputted from the second PWM output circuit 41 is specified to be higher than a pulse frequency outputted from the first PWM output circuit 19.

Then a first PWM output signal from the first PWM output circuit 19 and a second PWM output signal from the second PWM output circuit 41 are input to the EX-OR circuit 42. An output from the EX-OR circuit 42 are input to the filter 14. Signal with its waveform shaped to a sine wave is amplified by the amplifier 15 and output to the resolver 21 as the excitation power supply.

With this configuration, an amplitude of the PWM output signal from the first PWM output circuit 19 can be adjusted. That is, the second PWM output signal having a short cycle, meaning high frequency, as compared to the first PWM output signal and an EX-OR are obtained. In this case, if a duty ratio of an output signal from the second PWM output circuit 19 is large, an amplitude of the PWM output signal from the first PWM output circuit 19 can be increased. On the other hand if a duty ratio of the output signal from the second PWM output circuit 19 is small, an amplitude of the PWM output signal from the first PWM output circuit 19 can be decreased.

Providing the second PWM output circuit 41 for amplitude adjustment of the excitation power supply facilitates amplitude adjustment. This enables to accurately detect the rotation angle and speed by the resolver 21 even in case of fluctuation in characteristics of the amplifiers 25 and 26, or an environmental change. In the above explanation, the output from the first PWM output circuit 19 and the second PWM output circuit 41 are input to the EX-OR circuit 42, however they can be input to an EX-NOR circuit. With this configuration, it is possible to adjust an amplitude of an output waveform of the first PWM output circuit 19 without changing its waveform. It is preferable that a counter cycle of the second PWM output circuit 41 is shorter than that of the first PWM output circuit 19.

Fourth Embodiment

Figure 5:
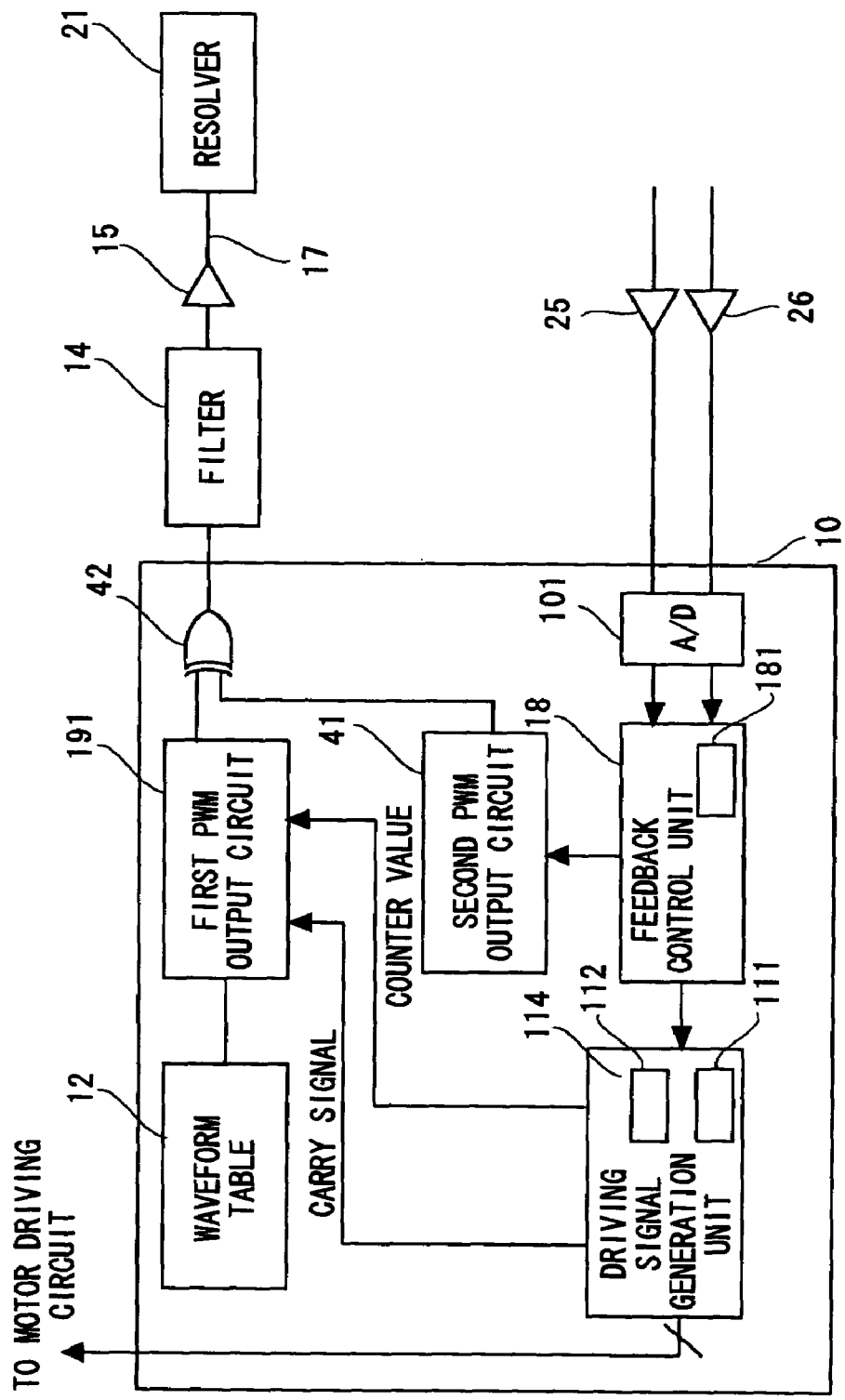
FIG. 5 is a view showing a configuration for sharing a counter in a motor control apparatus according to a fourth embodiment of the present invention.
Figure 6:
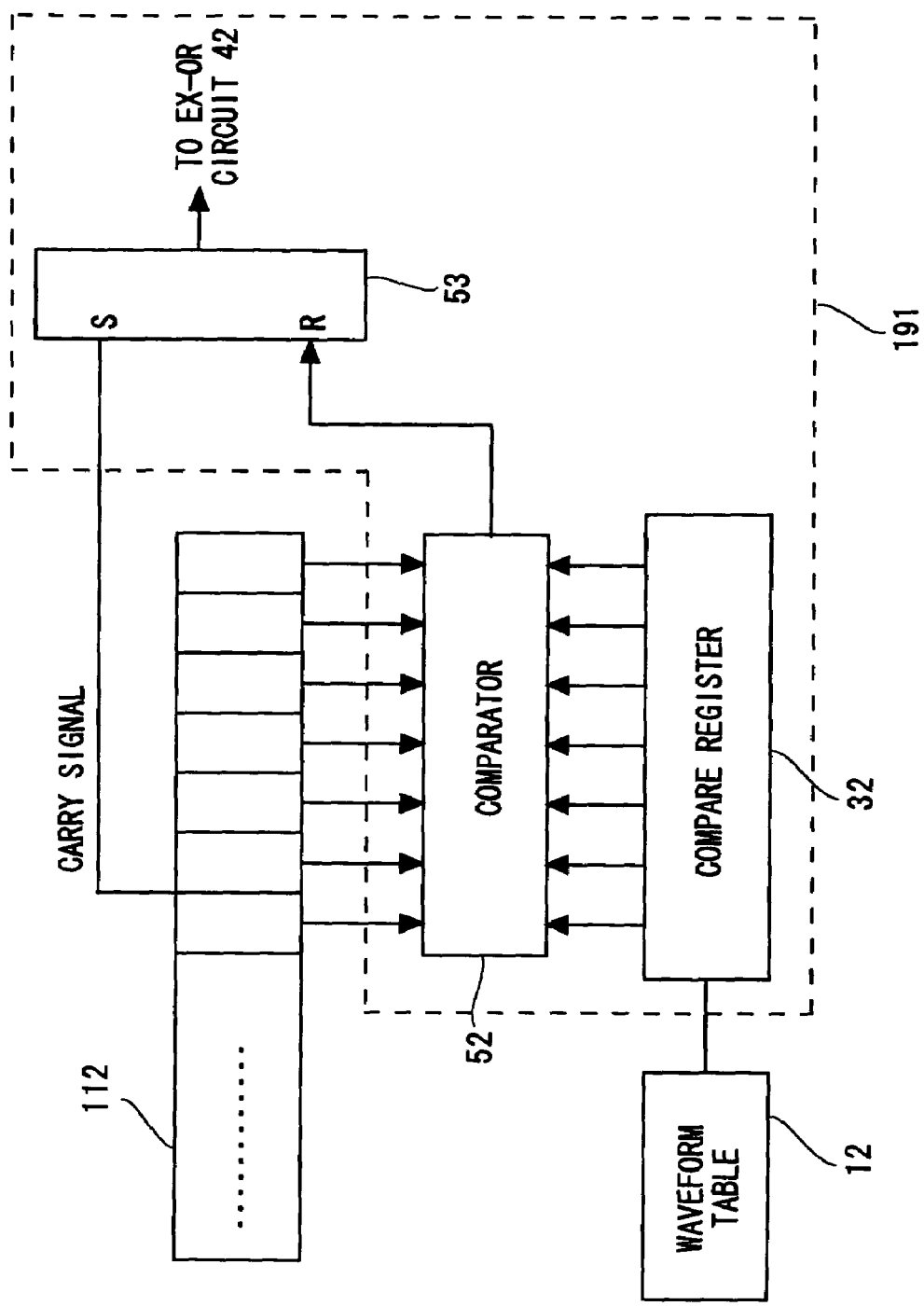
FIG. 6 is a block diagram showing a PWM output circuit of a motor control apparatus according to the fourth embodiment of the present invention.

The third embodiment uses the counter 31 exclusive for generating the excitation power supply. In this embodiment, the counter 31 is removed by sharing the counter 112 mounted inside the driving signal generation unit 11. This configuration is explained hereinafter in detail with reference to FIGS. 5 and 6. FIGS. 5 and 6 are views showing configurations of sharing a counter between a PWM output circuit 191 and a driving signal generation unit 114. FIGS. 5 and 6 show a part of MCU 10. Components identical to those in the third embodiment are not explained here. In this example, a block for generating the excitation power supply is comprised of a counter 112, a comparator 52, a compare register 32 for storing a value read out from the waveform table 12, and a flip-flop 53. The flip-flop 53 receives signals from the comparator 52 and the counter 112 to a reset terminal R and a set terminal S respectively. Further, an output from the flip-flop 53 is supplied to a terminal of an EX-NOR circuit 42.

The counter 112 is mounted to the abovementioned driving signal generation unit 114. The counter 112 may be 16 bits up counter. In the driving signal generation unit 114, 16 bits counter counts up at a count cycle corresponding to a clock frequency. A PWM pulse cycle of the excitation power supply is generally shorter than that of a driving signal. Accordingly a count value of the counter of the PWM output circuit 19 of the excitation power supply is smaller than that of the counter 112 of the driving signal generation unit 114. Therefore, low 7 bits of the counter 112 are used for the counter for the PWM output circuit 191.

An operation is described hereinafter in detail. As with the above embodiment, data of a sine wave is read out from the waveform table 12 and stored to the compare register 32. Then the comparator 52 compares the low 7 bits of the counter 112 with a value in the compare register 32. The flip-flop 53 is reset by a comparison result (signal for indicating an accordance) output from the comparator 52. Then the flip-flop 53 is set by a carry signal, the 7th bit of the counter 112. This generates a PWM signal having a duty ratio based on a value of the data of the sine wave read out from the waveform table 12. Two PWM output signals for driving signal and for excitation power supply can be obtained with one counter, even in case a PWM pulse cycle of the excitation power supply is different from that of a driving signal. Accordingly a counter can be shared between a driving signal and the excitation power supply, thereby reducing a circuit size and cost.

Although in the above explanation, the counters are 16 and 7 bit counter, it is not restricted to this. Using low bits of a counter having a large number of bits enables to share a counter. Further, the counter is not restricted to an up counter but may be a down counter.

In the above embodiments, a counter used for the PWM output circuit 19 is an up/down counter. However the counter may be an up or a down counter. As a sensor to detect a rotation angle of a motor, a resolver is used in this example. However it may be other sensors as long as the excitation power supply is supplied thereto and the sensor outputs a signal to detects the rotation angle correspondingly to the excitation power supply.

Further, a case an output of a D/A conversion circuit of a PWM output circuit is level shifted by a level shift circuit to change its amplitude is explained here. However it can be other than level shift circuit as long as it changes an amplitude of an output signal of a D/A conversion circuit or a PWM output circuit. A compare value is specified to a D/A conversion circuit or a PWM output circuit from a waveform table by DMA circuit. However it can be performed by an exclusive data transfer bas instead of using DMA transfer.

Furthermore, a case a sine wave is supplied as the excitation power supply is explained here. However it can be other waveform to be supplied as the excitation power supply.

Further, it is described that an amplitude of the excitation power supply is adjusted according to a control signal from a feedback unit. However amplitude of the amplifier circuit 16 mounted to the excitation power supply path to the resolver outside the MCU or the amplifiers 25 and 26 provided in an output path from the resolver outside the MCU may be changed according to a control signal.

It is apparent that the present invention is not limited to the above embodiment and it may be modified and changed without departing from the scope and spirit of the invention.

What is claimed is:

1. A motor control apparatus for controlling a motor based on an output from a sensor comprising:
   a storage unit storing a value according to an excitation power supply to excite the sensor;
   a first PWM (Pulse Width Modulation) output unit outputting a PWM output signal having a pulse width modulated to have a duty ratio corresponding to a value stored to the storage unit;

a second PWM output unit for amplitude adjustment for modulating a pulse width to have a duty ratio corresponding to an amplitude of the excitation power supply; and a filter input with the PWM output signal from the PWM output unit, wherein the sensor is supplied with the excitation power supply based on an output from the filter.

2. The motor control apparatus according to claim 1, wherein the amplitude of the excitation power supply is adjusted by the PWM output unit for amplitude adjustment.

3. The motor control apparatus according to claim 1, further comprising:

a driving signal generation unit generating a driving signal to drive the motor; and a counter provided in the driving signal generation unit operating in accordance with a clock signal and, wherein the PWM output unit outputs the PWM signal according to a counter value of the counter.

4. The motor control apparatus according to claim 3, further comprising:

a register storing a value to be compared with the counter value of the counter, wherein the motor control apparatus changes a duty ratio of the PWM output signal depending on a comparison result between the counter value and the value stored to the register.

5. A motor control method for controlling a motor based on an output from a sensor comprising:

storing a value based on an excitation power supply for exciting the sensor;

outputting a first PWM (Pulse Width Modulation) output signal having a duty ratio corresponding to the stored value;

outputting a PWM output signal for amplitude adjustment for adjusting an amplitude of the excitation power supply; and generating an excitation power supply for exciting the sensor according to the PWM output signal.

6. The motor control method according to claim 5, further comprising:

generating the excitation power supply of the sensor according to the PWM output signal for amplitude adjustment and the PWM output signal.

7. The motor control method according to claim 5, further comprising:

generating a driving signal for driving the motor based on a counter value of a counter; and generating the PWM output signal based on the counter value of the counter.

8. The motor control method according to claim 7, further comprising:

comparing a value stored to the a register with the counter value of the counter; and changing a duty ratio of the PWM output signal depending on a result of the comparison.

9. A motor control circuit for controlling a motor based on an output from a sensor comprising:

an excitation power supply generation unit generating an excitation power supply for exciting the sensor; and a feedback control unit generating a control signal in response to a sensor output signal outputted from the sensor according to an excitation power supply from the excitation power supply generation unit, wherein the motor control circuit controls an amplitude of the excitation power supply to be supplied to the sensor according to the control signal, and wherein a second control signal is generated to change the amplitude of the excitation power supply.

10. The motor control circuit according to claim 9, wherein in case the feedback control detects that the sensor output signal does not reach a specified amplitude, the feedback control unit outputs the second control signal to the excitation power supply generation unit to change the amplitude of the excitation power supply.

11. The motor control circuit according to claim 10, wherein the excitation power supply generation unit comprises a level shift circuit and changes the amplitude of the excitation power supply according to the control signal.

12. The motor control circuit according to claim 9, wherein the excitation power supply generation unit further comprises:

a first PWM (Pulse Width Modulation) output circuit generating an excitation power supply based on data from a waveform table;

a second PWM output circuit provided separately from the first PWM output circuit for outputting a PWM signal according to the control signal from the feedback control unit; and a circuit changing the amplitude by combining outputs from the first and the second PWM output circuits.

13. The motor control circuit according to claim 12, wherein the first PWM output circuit is comprised of a PWM output circuit for motor mounted to a driving signal generation unit for generating a driving signal for driving a motor.

14. The motor control circuit according to claim 13, further comprising:

an unit outputting a carry signal having a specified bits of a counter mounted to the PWM output circuit for motor;

a comparator comparing a value from the waveform table with an output value of the counter and outputting a result of the comparison; and a circuit generating a PWM signal from the carry signal and the comparison result.

15. The motor control circuit according to claim 12, wherein the circuit for changing the amplitude is comprised of an EX-NOR circuit.

16. The motor control circuit according to claim 9, wherein the sensor is comprised of a resolver for outputting information of a rotation angle of the motor as the sensor output signal by being supplied with an excitation power supply.

17. The motor control circuit according to claim 9, wherein the feedback control unit comprises:

an expected amplitude value storing circuit for storing an expected amplitude value of the sensor output signal outputted from the sensor;

wherein the expected amplitude value storing circuit compares the expected amplitude value with a maximum amplitude value of the sensor output signal outputted from the sensor, and controls the excitation power supply generation unit to change the amplitude of the excitation power supply corresponding to the difference between the expected amplitude value and the sensor output signal outputted by the sensor.

18. The motor control circuit according to claim 17, wherein the excitation power supply generation unit comprises a level shift circuit, and wherein the expected amplitude value storing circuit controls the level shift circuit to change the amplitude of the excitation power supply corresponding to the difference between the expected amplitude value and the sensor output signal outputted by the sensor.

* * * * *